Jan. 27, 1959  G. O. GABRIEL  2,871,384
STATOR CONSTRUCTIONS FOR SYNCHRONOUS HYSTERESIS MOTORS
Filed Sept. 14, 1955  4 Sheets-Sheet 1

INVENTOR.
GUSTAVE O. GABRIEL
BY
Zugelter & Zugelter
Attys.

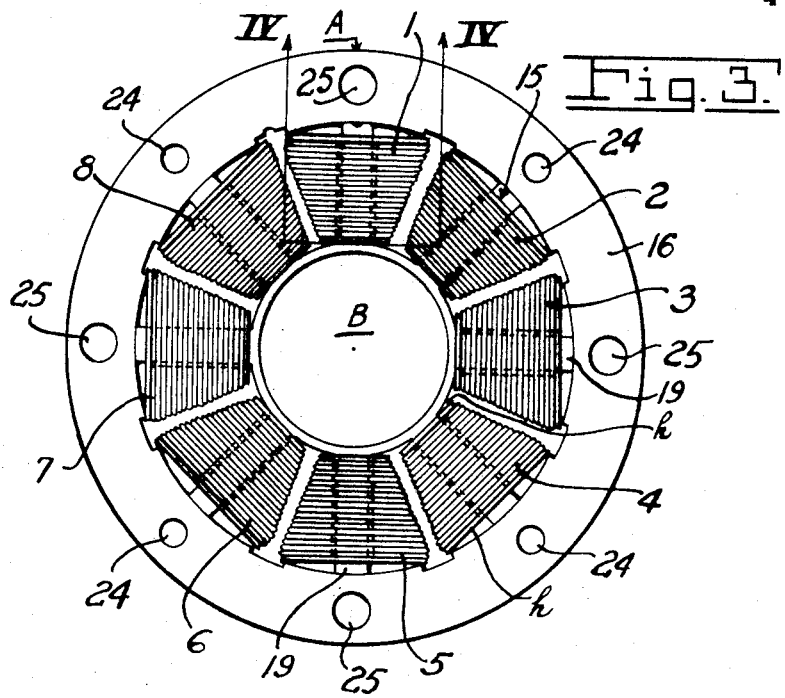
Fig. 3.
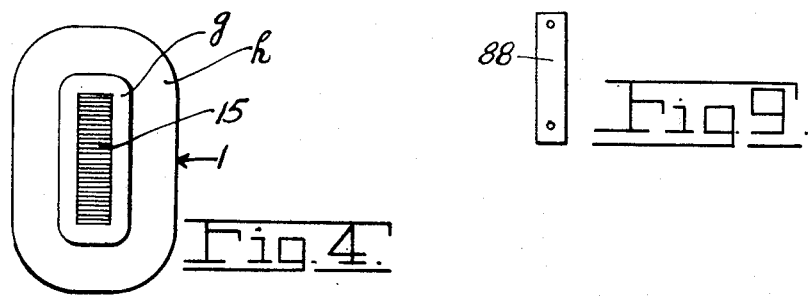
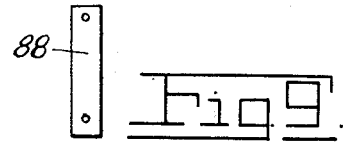
Fig. 4.    Fig. 9.
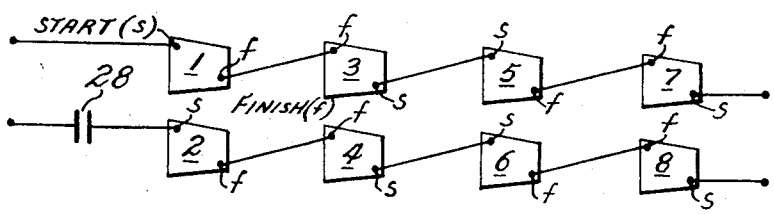
Fig. 8.
INVENTOR.
GUSTAVE O. GABRIEL
BY
Zugelter & Zugelter
Attys.

Jan. 27, 1959   G. O. GABRIEL   2,871,384
STATOR CONSTRUCTIONS FOR SYNCHRONOUS HYSTERESIS MOTORS
Filed Sept. 14, 1955   4 Sheets-Sheet 3

INVENTOR.
GUSTAVE O. GABRIEL
BY
Zugelter & Zugelter
Attys.

Jan. 27, 1959 G. O. GABRIEL 2,871,384
STATOR CONSTRUCTIONS FOR SYNCHRONOUS HYSTERESIS MOTORS
Filed Sept. 14, 1955 4 Sheets-Sheet 4
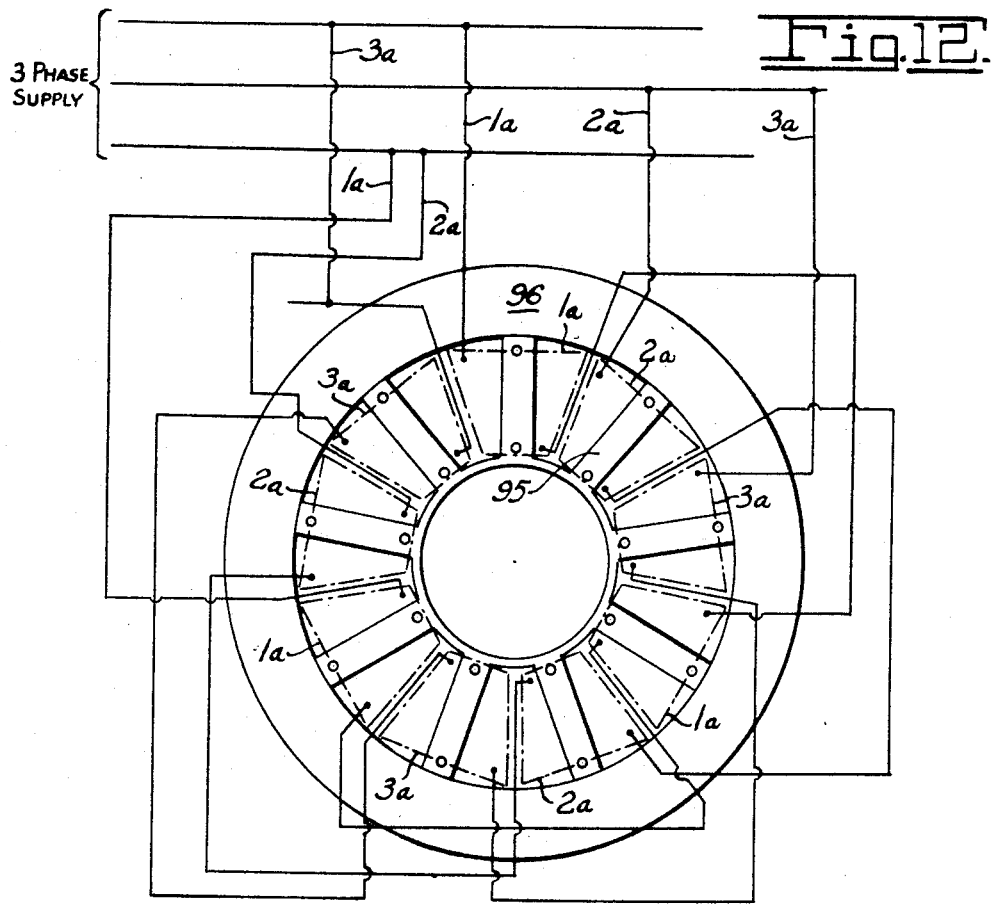
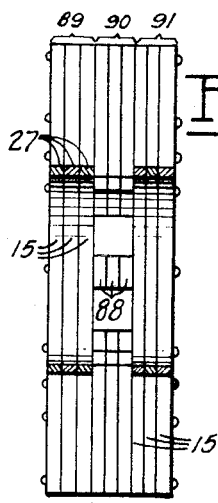
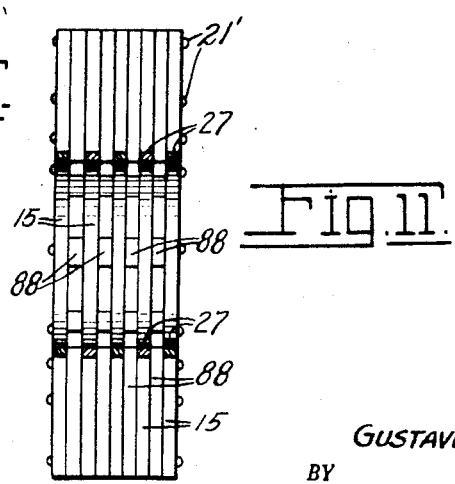
INVENTOR.
GUSTAVE O. GABRIEL
BY
Zugelter & Zugelter
Attys.

2,871,384

STATOR CONSTRUCTIONS FOR SYNCHRONOUS HYSTERESIS MOTORS

Gustave O. Gabriel, Washington Court House, Ohio, assignor of fifty percent to George W. Baker, Washington Court House, Ohio, ten percent to John Drew, Harrison, and five percent to Jessie Labanowski, Elmhurst, N. Y.

Application September 14, 1955, Serial No. 534,311

5 Claims. (Cl. 310—258)

This invention relates to synchronous motors of the hysteresis type which are self-starting on single-phase supply and which can be operated on two or three-phase supply. The application is a continuation in part of my copending applications Serial No. 441,368, filed July 5, 1954 and Serial No. 444,526, filed July 20, 1954, and now abandoned.

Many attempts have been made heretofore to build fractional horse power self-starting single-phase motors of the hysteresis type, including multiphase motors of this type, but such motors have been unsatisfactory because of excessive heating, low starting and running torques and excessive mechanical and electrical noises. Such motors have also been unsatisfactory because of their bulky size for the small power developed. Further, motors of this type have required cooling fans which are quite objectionable when used for driving recording or reproducing equipment, such as tape recorders and high fidelity record players and recorders because the fans produce objectionable noise which is picked up by the electronic system. To eliminate that noise, expensive filters are required in the electronic system.

The aforementioned motors have also been unsatisfactory because of excessively high cost to the consumer and excessively high manufacturing costs as well.

An object of this invention is to provide a fractional horse power synchronous motor of the hysteresis type that is efficient, can be totally enclosed, operated without a cooling fan and still have a temperature rise at full load that is below the allowable temperature rise for fractional horsepower motors.

Another object of the invention is to provide a multiphase, self-starting, synchronous motor of the hysteresis type having concentrated coil windings that can be wound on automatic machines, that has a tight and efficient magnetic circuit and which is provided with a rotor having a cylindrical body concentric with the axis of the shaft that is composed of permanent magnet material having relatively high retentivity and coercive force of such value that a relatively low magnetizing force will sufficiently magnetize the rotor to provide good starting and running torques.

Another object of the invention is to provide a motor of the above type in which all the essential parts of the frame and stator may be made by stamping and punch presses employing progressive dies so that the cost of making such a motor will be materially less than the cost of making any comparable motor now available on the market.

A still further object of the invention is to provide a stator for a synchronous motor of the above type, a portion of which is of laminated spider formation, the laminations having a plurality of uniformly spaced radial spokes which are connected at their inner ends by continuous relatively thin web (the coil windings being mounted on the spokes) and a laminated ring that is either shrunk or pressed on the outer ends of the spokes, thereby providing a tight, efficient magnetic circuit.

A still further object of the invention is to provide a method of thermo-treatment of the stators of electric motors of the above type to improve the magnetic properties thereof and at the same time to facilitate assembly of the stators.

The above and other objects of the invention will in part be apparent and will in part be obvious to those of ordinary skill in the art to which the invention pertains, from the following description taken in conjunction with the accompanying drawings.

In the drawings:

Fig. 3 is an end view of the stator and coil assembly of the motor shown in Figs. 1 and 2;

Fig. 4 is a view in section taken on line IV—IV of Fig. 3;

Fig. 8 is a more or less schematic circuit diagram of the coil windings as connected to provide in the case of single-phase voltage supply, a rotating vector that makes the motor self-starting and synchronous in operation;

Fig. 9 is a view of a stator lamination employed with the punching of Fig. 6 in the assembly of the motor;

Fig. 10 is a view in section of a stator assembled from the punchings of Figs. 6 and 9;

Fig. 11 is a view in section similar to Fig. 10 but illustrating a modified form of assembly of the stator punchings of Figs. 6 and 9; and Fig. 12 is a view of a motor designed for operation on a three-phase voltage supply.

Figure 1:
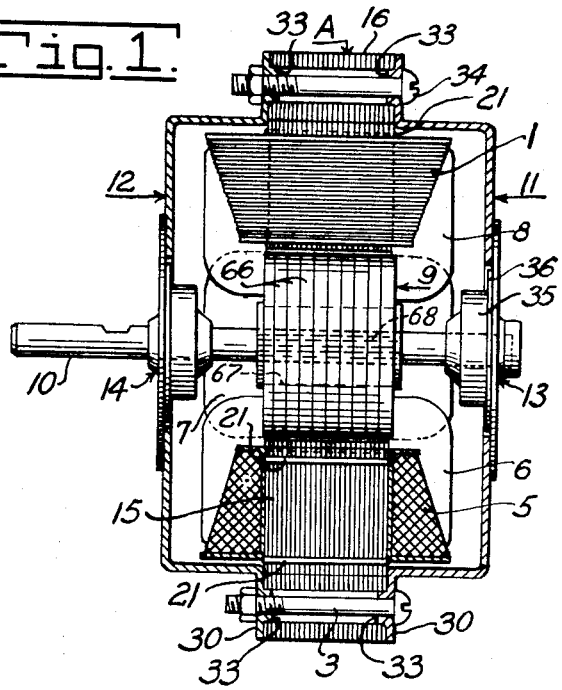
Figure 1 is a view in vertical section on line I—I of Fig. 2 of a synchronous motor of the hysteresis type embodying a form of the invention, the rotor and bearing assemblies being shown in full.
Figure 2:
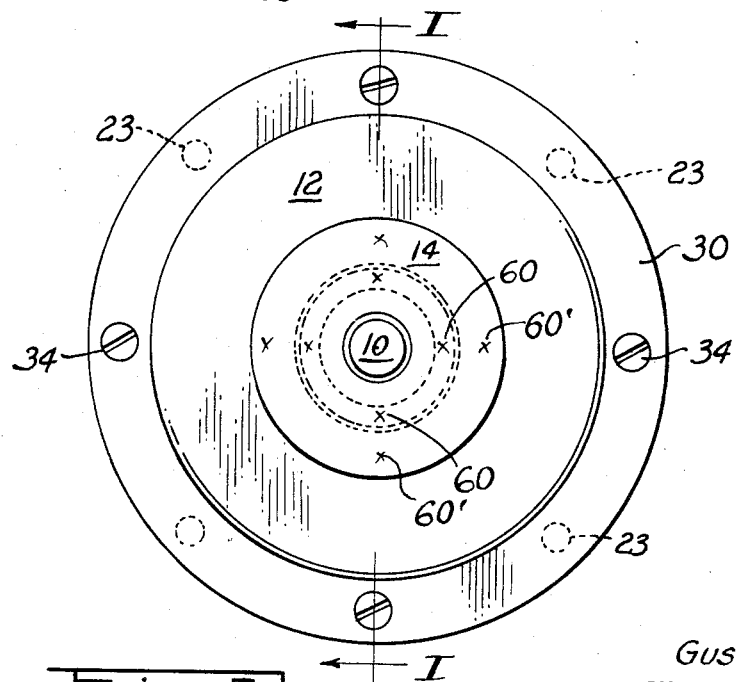
Fig. 2 is an end view of the motor shown in Fig. 1.

In Figs. 1 to 4 inclusive, a multipole, self-starting, synchronous motor is illustrated. The number of poles selected for a given design is determined by the rotor speed desired. The particular motor illustrated is a four-pole motor and therefore operates at a synchronous speed of 1800 R. P. M. on 60 cycle voltage.

The motor comprises a stator A having coil windings 1, 3, 5 and 7 which form the main circuit windings so-called, and coil windings 2, 4, 6 and 8 which constitute the auxiliary or condenser circuit windings, so-called because these windings 2, 4, 6 and 8 are connected in series with a condenser. The motor also includes a rotor 9 having a shaft 10 and a case or housing comprising end frames or covers 11 and 12 having bearing assemblies 13 and 14 respectively in which the shaft 10 is journaled.

Figure 6:
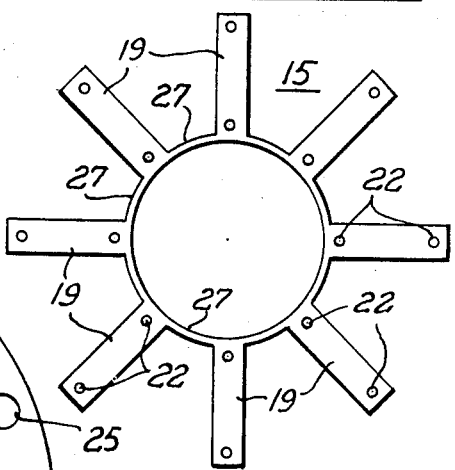
Fig. 6 is a view of a stator spider punching.
Figure 7:
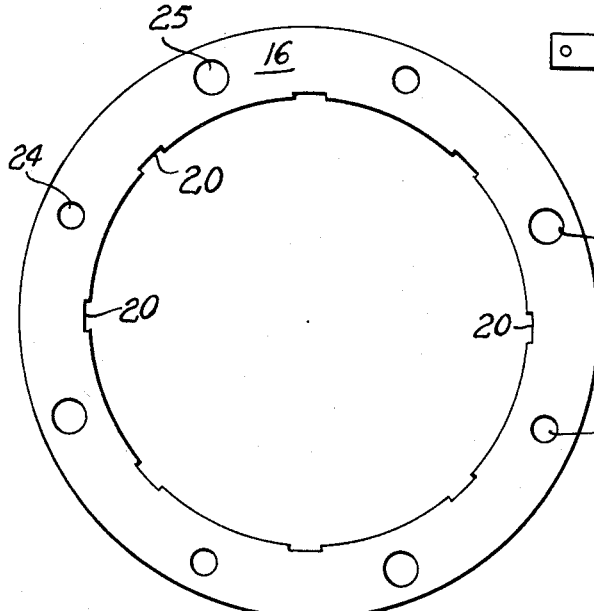
Fig. 7 is a view of a stator ring punching.

The particular motor illustrated is shown substantially to full scale. The stator is approximately one inch thick being formed of a plurality of laminations such as shown in Figs. 6, 7 and 9. The thickness of each lamination is about 1/70 of an inch; therefore that particular motor has approximately 70 laminations. The outside diameter of the stator is approximately 4.625 inches and the rotor bore B in which the rotor rotates has a diameter of approximately 1.5 inches. The diameter of the rotor is approximately 1.496 to 1.492 inches, thereby providing an air gap of the order of 0.002 to 0.004 inch.

Figure 5:
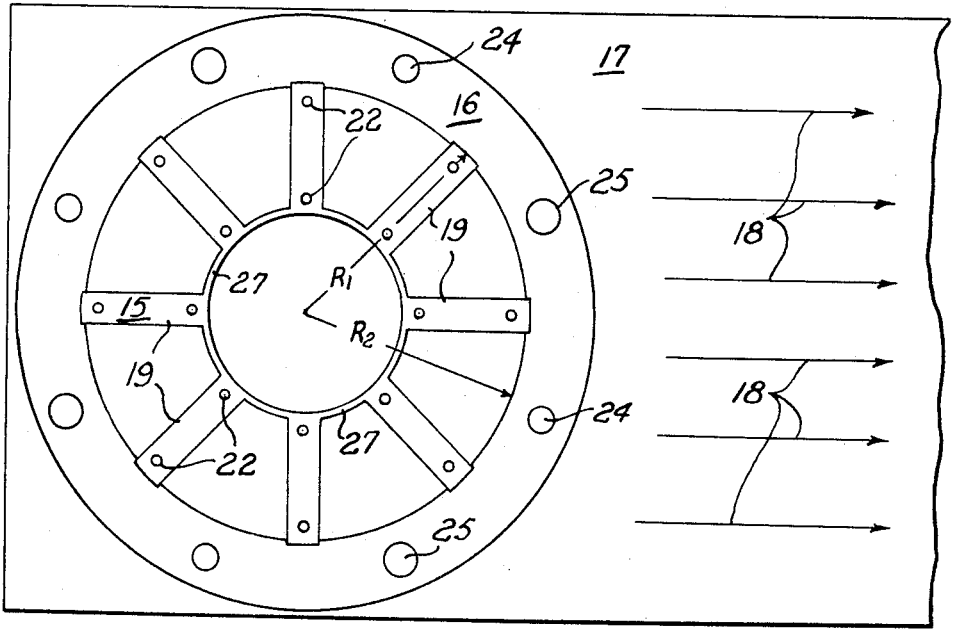
Fig. 5 is a plan view of a sheet of electric steel having an oriented grain structure from which the stator punchings are formed.

Some of the stator punchings are illustrated more in detail in Figs. 5, 6 and 7. As shown in Fig. 5, the spider laminations 15 and the ring laminations 16 are formed from a sheet of electric steel 17 in which the grain is preferably oriented lengthwise of the sheet as indicated by the arrows 18. The spider laminations 15 and the ring laminations 16 may be formed from the sheet with a progressive die. As indicated in both Figs. 5 and 7, the radial distance from the center of bore B to the ends of the spokes 19 is greater than the radius of the inner circle of the ring laminations 16. That is the spokes have a radial length of R1 from the center of the rotor bore to their outer ends which is greater than the radius R2 of the inner surface or circle of the ring laminations. To illustrate that the radius R1 is greater than the radius R2, the length of the spokes have been exaggerated. By punching out spokes having a radius length R1, the ring laminations will have notches 20 on their inner surface. When the ring laminations are placed on the spider laminations, the ring laminations are rotated 22.5 degrees from the position of Fig. 5, and either pressed over the spokes, or shrunk on after either heating the ring laminations, or cooling the spider punchings. The pressing on or the shrinking on of the ring laminations provides a very tight fit between the inner circle of the rings and the ends of the spokes whereby the motor parts are held firmly together.

When the stator punchings 15 and 88 have been assembled by stacking about 70 laminations, they are riveted together by means of rivets 21 that are passed through the rivet holes 22. The coil windings are then placed on the spokes in the order indicated in Fig. 3 after which the laminated ring is pressed on. The ring laminations, when assembled, are secured compactly by rivets 23 located in rivet holes 24. The assembly of ring punchings is rotated with reference to the spokes on the spider punchings 15 until the ends of the spokes are opposite bolt holes 25 and the rivet holes 24. Therefore, the ring punching assembly will either have to be pressed on or the spider punchings will have to be cooled until they shrink sufficiently to be received in the ring laminations at the locations indicated.

As shown in Figs. 5 and 6, the inner ends of the spokes of those spider punchings are connected by webs 27. In a preferred form of the invention these webs should be as narrow as possible without sacrificing rigidity of the punchings for handling purposes. By making the webs approximately 1/32 of an inch thick the spider will have sufficient rigidity. At the same time thin webs will cause more of the flux developed by the coil windings to pass into the rotor and thereby increase the magnetization thereof.

The coil windings 1, 3, 5 and 7 for purposes of description are called the main coil windings because they are connected in series with each other and across the voltage supply which normally would be 115 volts. The coil windings 2, 4, 6 and 8 are connected in series with a condenser 28 as shown in Fig. 8. The windings 1, 3, 5 and 7 may contain 400 to 500 turns of No. 23 or 24 gauge copper magnet wire provided with an insulating coating. The coil windings 2, 4, 6 and 8 may contain 600 to 700 turns of number 26, 27 or 28 gauge copper magnet wire also coated with insulating material. By providing more turns in the auxiliary winding and turns of finer wire, the coil windings will have a higher reactive impedance and at the same time a sufficient amount of D. C. resistance to provide such value of in-phase current that the final current in the coils 2, 4, 6 and 8 will be 45 to 90 electrical degrees out of phase with the current in the windings 1, 3, 5 and 7, depending on the values of reactive impedance and D. C. resistance of the coils 2, 4, 6 and 8 and the capacity in mfds of condenser 28. Since the current through the windings 2, 4, 6 and 8 is phased 45 to 90 electrical degrees, with respect to the current in windings 1, 3, 5 and 7, and furthermore, since the windings 2, 4, 6 and 8 are displaced 45 geometrical degrees with respect to the windings 1, 3, 5 and 7, a rotating vector is provided which causes the rotor to be self-starting and operative at synchronous speed.

When windings, such as described, are employed, it has been found that the motor will start when the capacity of condenser 28 is as low as 2 microfarads. By increasing the capacity of the condenser 28 from two to six or seven mfds, the starting torque and the pull-out torque increases almost in direct proportion to the size of the condenser. A condenser having a capacity in excess of six or seven microfarads should be avoided for the motor under consideration because it will draw too much current for the auxiliary coils and cause the motor to heat excessively.

By employing a condenser having a capacity of two to six microfarads, the motor will have a temperature rise at a load 6.5 to 8 inch ounces of torque of approximately 38 degrees centigrade in two and one-half hours of continuous operation, even though the motor is totally enclosed and is not provided with a fan.

When electric steel, having oriented grain structure as indicated in Fig. 5, is employed, the punchings 15 are so assembled that a substantial amount of the grain structure in the spokes of the spider will be radial thereof. This can be accomplished by rotating each spider 45 degrees with respect to the preceding spider as it is placed thereon until all of the spider punchings have been laid. In this manner the orientation of the grain structure is utilized in each of the spokes of the stator spider.

The rotor comprises a plurality of discs 66 which are relatively thin, say of the order of 1/8 of an inch, having center holes or apertures slightly larger than the diameter of the shaft 10. The discs 66 and the shaft 10 are placed in a fixture that holds the discs and shaft in concentricity with each other. A material 67 is then poured into the space between the shaft and the walls of the apertures. Upon heating, the material hardens and secures the discs firmly to the shaft. The shaft may have die-formed knurls 68 therein to increase the grip of material 67 on the shaft.

The material 67 may be composed of a mixture of fine silica, a thermo-setting resin and a catalyst. The proportions may be as follows:

| | By weight percent |
|---|---|
| Silica (320 mesh) | 20 |
| Cumene hydro peroxide | 10 |
| Seletron polystyrene resin | 70 |

The above mixture will pour. When heated to about 200° F. it solidifies into a hard stone-like mass.

The discs 66 are preferably formed of a mixture of powdered metals and a binder. They are pressed to the size and thickness required in a die. The pressed discs are then sintered in a furnace at the proper temperature. The discs may be composed of a mixture of aluminum, nickel, copper, cobalt and iron, such as are used in permanent magnet materials known in the trade as Alnico magnet alloys by various numbers. For example, the material may conform to Alnico V in which event the composition is as follows: Aluminum 8 percent, nickel 4 percent, copper 3 percent, cobalt 25 percent and the balance iron. By varying slightly the amount of the cobalt and one or more of the components, the magnetic characteristics of the material may be changed.

Thus, as shown in Fig. 10, the stator may be formed of three sections 89, 90 and 91. The sections 89 and 91 are composed of the spider laminations 15 and the section 90 of the stubby laminations 88. The stator of Fig. 10 will provide materially higher flux density in the rotor bore B' at the ends of section 90 than at the inner ends of sections 89 and 91 because the bridges 27 thereof shunt much of the flux from one spoke to another. That type of construction may give a slight tooth ripple but that ripple will not be of such magnitude as to cause disturbances that cannot be handled in the driving of sound recorders and sound reproducers.

In Fig. 11 a different form of stator is illustrated. It is formed of the same punchings 15 and 88, but the spider punchings 15 and the stubby punchings 33 are alternated. Because of the fact that these punchings are so thin, being about 1/70 of an inch thick, the thickness of the laminations in Fig. 11 have been exaggerated in order to show the alternate layers.

From the foregoing it will be apparent that the higher the magnetization available in the rotor bore the more power the motor will have. Also the condenser capacity in the auxiliary windings can be less.

A motor, as shown and provided with a permanently magnitizable rotor, performed under test as indicated by the following tables.

*No. 1.—Relatively high coercive Alnico #V in rotor*

[Line voltage 115 v.—60 cycles/sec.]

| Capacitance, mfd. | Pull Out Torque in. oz. | Starting Torque in. oz. |
|---|---|---|
| 5 | 10.0 | 3.75 |
| 4 | 8.75 | 3. |
| 3 | 6.0 | 1.75 |

HEAT RUN AND EFFICIENCY TEST

| Line Volts | 115 v | Capacitor | 4 mfd. |
|---|---|---|---|
| Capacitor Volts | 252 v | Running Torque | 6.5 in. oz. |
| Power Input | 25 w | Speed | 1,800 R. P. M. |
| Line Current | .365 a | Power Output | .0116 H. P. |
| Efficiency | 34.7% | Power Factor | .596 |

Temperature rise of stator laminations _____ ° C __ 38
Temperature rise of capacitor winding _____ ° C __ 83
Temperature rise of line winding _____ ° C __ 83

*No. 2.—Relatively low coercive Alnico #V in rotor*

| Capacitance, mfd. | Pull Out Torque in. oz. | Starting Torque in. oz. |
|---|---|---|
| 5 | 7.25 | 4.5 |
| 4 | 7.5 | 3.75 |
| 3 | 6.0 | 2.75 |

HEAT RUN AND EFFICIENCY TEST

| Line Volts | 115 v | Capacitor | 4 mfd. |
|---|---|---|---|
| Capacitor Volts | 252 v | Running Torque | 6.5 in. oz. |
| Power Input | 25.6 w | Speed | 1,800 R. P. M. |
| Line Current | .36 a | Power Output | .0116 H. P. |
| Efficiency | 33.8% | Power Factor | .617 |

Temperature rise of stator laminations _____ ° C __ 37
Temperature rise of capacitor winding _____ ° C __ 83.5
Temperature rise of line winding _____ ° C __ 81

From the above tables the effect of Alnico alloys in the rotors having different magnetic properties is clearly apparent. The rotor of No. 1 had a higher pull-out torque than the rotor of No. 2 but rotor of No. 2 had a higher starting torque. The material of rotor of No. 2 had a lower coercive force than that of the rotor of No. 1. The power input to the motor with either rotor was substantially the same and the efficiencies are within approximately 1 percent of each other. The power factor was unusually high, being approximately 60 percent for each motor, the one being slightly more than 60 percent and the other slightly less. Both motors operated at a torque load of 6.5 inch-ounces for two and a half hours. The stator had temperature rise of 38° centigrade. The temperature rise of that motor, being totally enclosed and without benefit of a cooling fan, is outstandingly low. Considering also that the rotor was only one inch long, the load performance was outstanding. The length of the rotor and the thickness of the stator may be increased to increase the power of the motor without materially increasing the physical size thereof.

THERMAL TREATMENT OF STATOR SPIDER

The magnetic density in the stator spider may be increased for a given magnetizing force by placing the assembled spider punching in a deep-freeze and cooling the assembly to a temperature of about −120° F. When the chilled assembly is removed from the deep-freeze, the coils are placed on the spokes following which the stator ring assembly is slipped over the ends of the spider spokes. As the spider warms up the spokes expand against the ring and provide the shrink fit desired.

The motor which has been described supra is designed as stated for operation on a single-phase source of voltage supply which requires the use of condenser 28 in the auxiliary coil circuit. That motor may also be operated on a two-phase voltage supply by omitting the condenser 28 and connecting the coils 1, 3, 5 and 7 across one phase of the two-phase supply and connecting coils 2, 4, 6 and 8 across the other phase. Where two-phase voltage is available the number of turns and the gauge of the wire employed in coils 2, 4, 6 and 8 should preferably be the same as the number of turns and gauge of wire employed in the coils 1, 3, 5 and 7.

In Figure 12 there is illustrated a motor embodying the invention which is designed for operation on a three-phase voltage supply. The motor of Fig. 12 would be constructed in the same manner as the motor of Figs. 1 and 10 and 11. The stator 94 is formed from a pack of spider laminations 95 having nine spokes equally spaced and a pack of rim or ring laminations 96 which are either shrunk on or pressed on the ends of the spokes. A coil is provided on each spoke. The coils on the spokes identified by the numerals 1a are connected in series with each other, the finish of one coil being connected to the finish of the other. Similarly the coils marked 2a are also connected in series and form the second phase of the stator winding and the coils marked 3a comprise the coils of the third phase, these coils also being connected in series. The coils of the three phases 1a, 2a and 3a are connected across a three-phase supply as shown in Fig. 12. The rotor of the motor of Fig. 12 operates at synchronous speed, the particular speed being equal to the frequency of the supply source divided by half the number of poles; in other words, the speed, considering the arrangement of Fig. 12 as a nine pole motor, would be 800 R. P. M.

From the foregoing description it will be apparent to those skilled in this particular art that the stator spiders may be designed to have as many or as few spider spokes as desired depending upon the particular speed at which the rotor is to operate.

Having thus described the invention, it will be apparent to those of ordinary skill in the art to which the invention pertains that various modifications and changes may be made in the illustrated embodiment without departing from either the spirit or the scope of the invention.

Therefore, what is claimed as new and desired to be secured by Letters Patent is:

1. A stator for an electric motor of the hysteresis type, including a spider having a plurality of laminations of magnetic material, each lamination having radially extending spoke portions of uniform width connected at their inner ends by a continuous web integral therewith, the web defining a cylindrical bore for receiving the rotor of such motor, said spider also including a plurality of individual spoke laminations of rectangular form interspersed between spoke portions of the first-named laminations and of uniform width therewith, said individual spoke laminations extending from the rotor bore to the extremities of the other spoke laminations, whereby the spoke portions of the spider will be formed solidly of contiguous laminations and will be of substantially rectangular uniform cross-section throughout their length, and the web portions of the spider will be formed with spaces between laminations, and a ring of laminated magnetic material surrounding said spider and having pressure engagement with the outer ends of its spokes.

2. A stator as in claim 1 in which alternate spokes are provided with preformed main coil windings, said spokes extending axially through the windings, and concentrated auxiliary coil windings are provided on the remaining spokes, said spokes extending axially through said windings.

3. A stator as in claim 1, wherein the individual spoke laminations are arranged in alternation with the laminations that include web portions.

4. A stator as in claim 1, wherein the laminations that include web portions are arranged in groups of contiguous laminations, said groups being separated by interspersed individual spoke laminations.

5. A stator as in claim 1, having preformed coil windings on the spokes substantially filling the winding space between spokes, the spokes extending axially through the windings.

References Cited in the file of this patent

UNITED STATES PATENTS

| Number | Name | Date |
|---|---|---|
| 1,046,834 | Mills | Dec. 10, 1912 |
| 1,707,424 | Bailey | Apr. 2, 1929 |
| 1,809,197 | Fendrich | June 9, 1931 |
| 1,978,484 | Aufiero | Oct. 30, 1934 |
| 2,007,398 | Kobzy | July 8, 1935 |
| 2,039,456 | Sommarone | May 5, 1936 |
| 2,221,983 | Mayer et al | Nov. 19, 1940 |
| 2,245,433 | Delmonte | June 10, 1941 |
| 2,316,693 | Hoddy | Apr. 13, 1943 |
| 2,412,254 | Edelman | Dec. 10, 1946 |
| 2,423,345 | Roters | July 1, 1947 |
| 2,561,583 | Marvin | July 24, 1951 |
| 2,565,530 | Smith | Aug. 28, 1951 |
| 2,606,083 | Kitto et al. | Aug. 5, 1952 |
| 2,607,816 | Ryder et al. | Aug. 19, 1952 |
| 2,617,723 | Studders et al. | Nov. 11, 1952 |
| 2,668,086 | Marzolf | Feb. 2, 1954 |
| 2,680,822 | Brainard | June 8, 1954 |

FOREIGN PATENTS

| Number | Country | Date |
|---|---|---|
| 174,435 | Switzerland | Apr. 16, 1935 |